(12) United States Patent
Baboval, II et al.

(10) Patent No.: US 12,379,950 B2
(45) Date of Patent: Aug. 5, 2025

(54) UPDATING VIRTUAL IMAGES OF COMPUTING ENVIRONMENTS

(71) Applicant: Citrix Systems, Inc., Fort Lauderdale, FL (US)

(72) Inventors: John Victor Baboval, II, Littleton, MA (US); Thomas Carl Goetz, Wareham, MA (US)

(*) Notice: Subject to any disclaimer, the term of this patent is extended or adjusted under 35 U.S.C. 154(b) by 776 days.

(21) Appl. No.: 17/508,225

(22) Filed: Oct. 22, 2021

(65) Prior Publication Data

US 2023/0131665 A1 Apr. 27, 2023

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
CPC ......... G06F 9/45558; G06F 2009/4557; G06F 8/658
See application file for complete search history.

(56) References Cited

U.S. PATENT DOCUMENTS

| | | | |
|---|---|---|---|
| 2012/0192179 A1* | 7/2012 | Ammons | G06F 8/658 718/1 |
| 2012/0260249 A1* | 10/2012 | Peraza | G06F 8/65 718/1 |
| 2013/0106896 A1* | 5/2013 | De Pauw | G06T 11/206 345/589 |
| 2015/0178105 A1* | 6/2015 | Graham | G06F 9/45558 718/1 |
| 2015/0227567 A1* | 8/2015 | Zamir | G06F 16/188 709/223 |
| 2018/0239921 A1* | 8/2018 | Goyal | G06F 21/6227 |
| 2019/0065213 A1* | 2/2019 | Li | G06F 9/45558 |
| 2020/0301784 A1* | 9/2020 | Chen | G06F 3/0604 |
| 2021/0075855 A1* | 3/2021 | Spillane | G06F 16/178 |
| 2021/0288885 A1* | 9/2021 | Malleni | H04L 41/40 |
| 2022/0222223 A1* | 7/2022 | Wu | G06F 16/192 |

* cited by examiner

*Primary Examiner* — Kenneth Tang

(57) ABSTRACT

Methods and systems for allowing for incremental updates to remote localized copies of disk images (e.g., virtual machine images) are described. In some implementations, the disk images are block-based. The incremental updates may be done in a bi-directional manner across different platforms such that an update to any platform may be prepared for any of the other platforms. Preparation of updates between platforms may be accomplished through one or more of combining disk images, differencing disk images, snapshotting disk images, and/or versioning disk images.

20 Claims, 9 Drawing Sheets

UPDATING VIRTUAL IMAGES OF COMPUTING ENVIRONMENTS

FIELD

Aspects described herein generally relate to computer networking, remote computer access, virtualization, and hardware and software related thereto. More specifically, one or more aspects described herein provide for techniques of updating images on computing platforms.

BACKGROUND

Virtualization allows multiplexing of the underlying host machine between different virtual machines (VMs). The host computer allocates a certain amount of its resources to each of the virtual machines. Each virtual machine is then able to use the allocated resources to execute applications, including operating systems or guest operating systems. The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Computing platforms may be environments in which a piece of software is executed. Different computing platforms may have different levels of abstraction including hardware, operating systems, web browsers, application programming interfaces, or other underlying software. Computing platforms may also be virtual. Different computing platforms may also have different constraints that provide for different functionality and restrictions. When preparing VM images between computing platforms, the image must be changed in order to work in its new environment. If an image is changed for a new environment, and then subsequently updates are applied to the image in its source environment, the differences between versions in a source environment can no longer be applied directly to the environment specific version in the new environment. This is due to those versions having machine-specific information, instance-specific information, and/or platform specific files and operations. This information and platform specific files and operations prevents being able to take further updates to those environments and apply them to other environments without those same information and platform specific files and operations. This may limit updates to coming from a single golden image and/or authoring environment. To overcome these limitations, and to overcome other limitations that will be apparent upon reading and understanding the present specification, aspects described herein are directed towards techniques of updating images on virtualized or other computing platforms where the images can be updated in a bi-directional manner such that any environment may be the host environment for updating other environments.

These and additional aspects will be appreciated with the benefit of the disclosures discussed in further detail below. In some examples, a computing device may identify an image in response to receipt of a request to prepare updates between disk images of different computing environments running on computing devices, the image being a common disk image between previous versions of the disk images. The computing device may determine a binary file of differences between a disk image of one of the computing devices and the identified image; attach, using another of the computing devices, the image and the binary file of differences to an appliance executable on that device and create, using the another of the computing devices, another disk image by applying, using the appliance and the binary file of differences, differences to the identified image.

In some examples, the computing device may generalize the another disk image and apply platform specific files and operations to the generalized another disk image.

In some examples, the image and the identified image may be attached to a compositing engine, the appliance may be created on the another of the computing devices, and the preparation may be reversible after any updates to the another disk image running on the another of the computing devices.

In some examples, creating the another disk image may be done on the another of the computing devices consequent to receiving the binary file of differences by the another of the computing devices.

In some examples, the computing device may track versions of the disk images of different computing environments running on computing devices. Creating the another disk image may create a new version of the another disk image operating on the another of the computing devices and the new version of the another disk image operating on the another of the computing devices may be added to the tracked version of the another disk image operating on the another of the computing devices.

In some examples, version may be tracked using at least one of image cloning, differencing disks, or snapshots.

In some examples, the image and the another disk image may respectively exist on at least one of a hypervisor or a cloud platform.

In some examples, previous versions of images of each of the image and the another disk image may be accessible.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
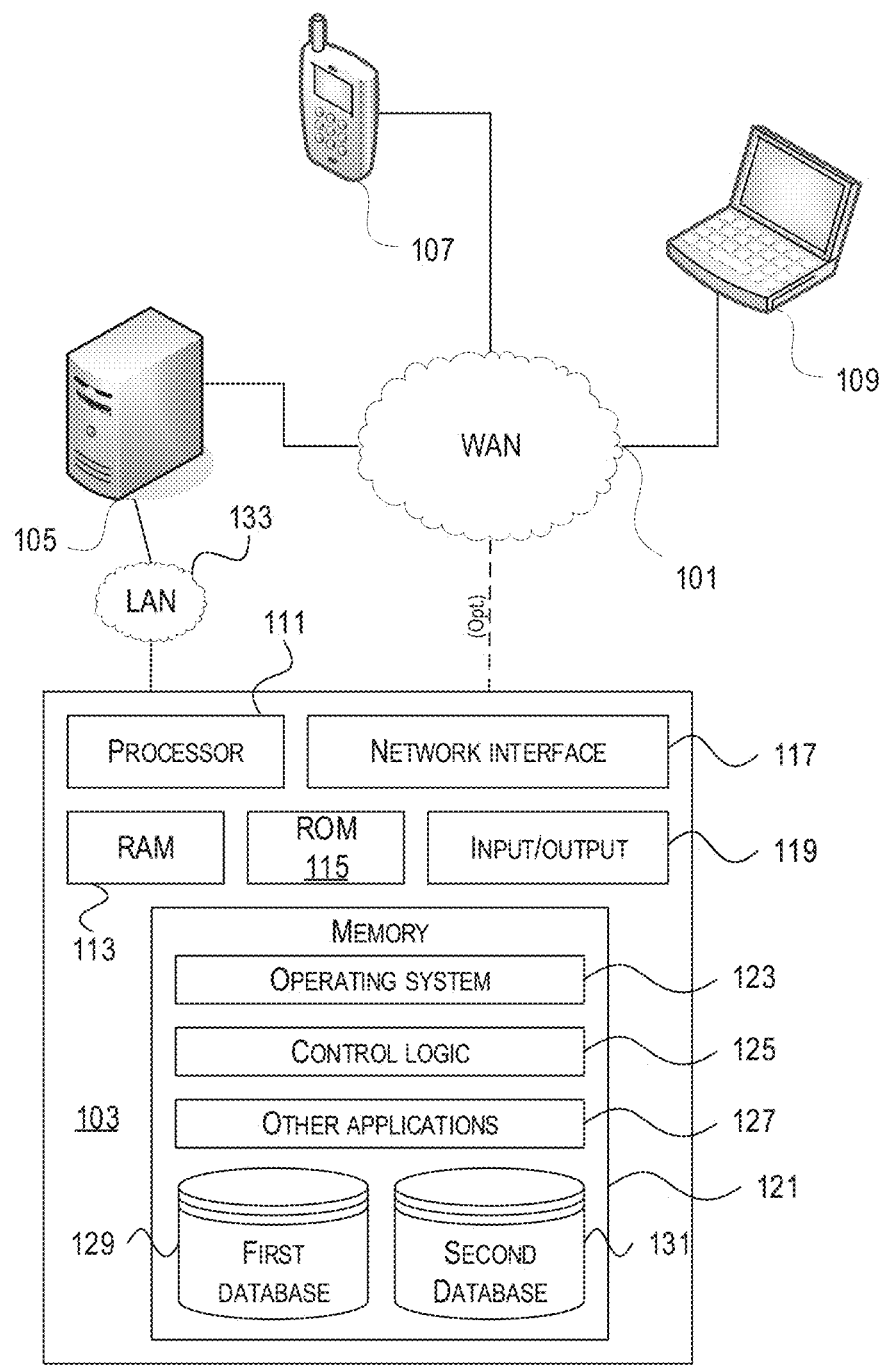
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards allowing for incremental updates to remote localized copies of disk images (e.g., virtual machine images). In some described implementations, the disk images are block-based. Blocks of disk images are evenly sized partitions of data where each block may have its own address. The incremental updates may be done in a bi-directional manner across different platforms such that an update to any platform may be prepared to any of the other platforms. Incremental updates in a bi-directional manner may mean that updates done on any identified platform may then be prepared for another platform or any updates done for the other platform may be prepared for the identified platform. In some implementations, this may be accomplished by having a shared ancestor image available between disk images of the two or more different platforms so that only differences need to be sent between the updates of the originating platform and the shared ancestor image to the destination platform. The destination platform may be a platform with a disk image that needs to be updated with the same updates as a disk image from an originating platform. This preparation of an update to a destination platform may be able to be accomplished by only having to transfer a binary file of differences (i.e., a binary diff) from a previous disk image version. A shared ancestor image may be a parent disk image that is common to disk images on two or more platforms of the different platforms. Other, inefficient methods require the transfer of an entire disk image comprising the required updates from a single golden image and/or authoring environment. Preparation of updates between platforms may be accomplished through one or more of combining disk images, differencing disk images, snapshotting disk images, and/or versioning disk images.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," and similar terms, is meant to include both direct and indirect mounting, connecting, and coupling.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. The various methods described herein may comprise an algorithm executed on a computing device. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
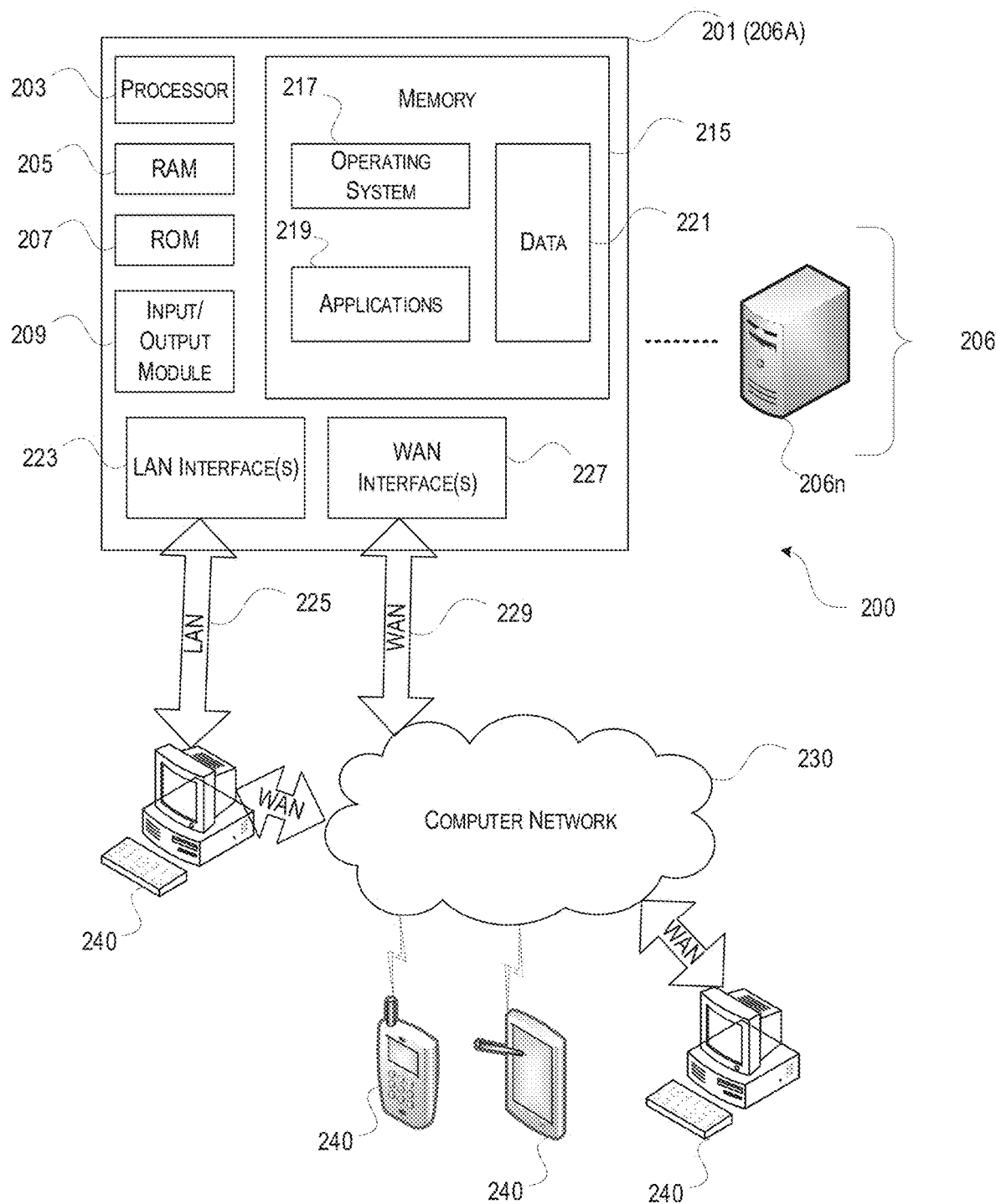
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206*a* in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
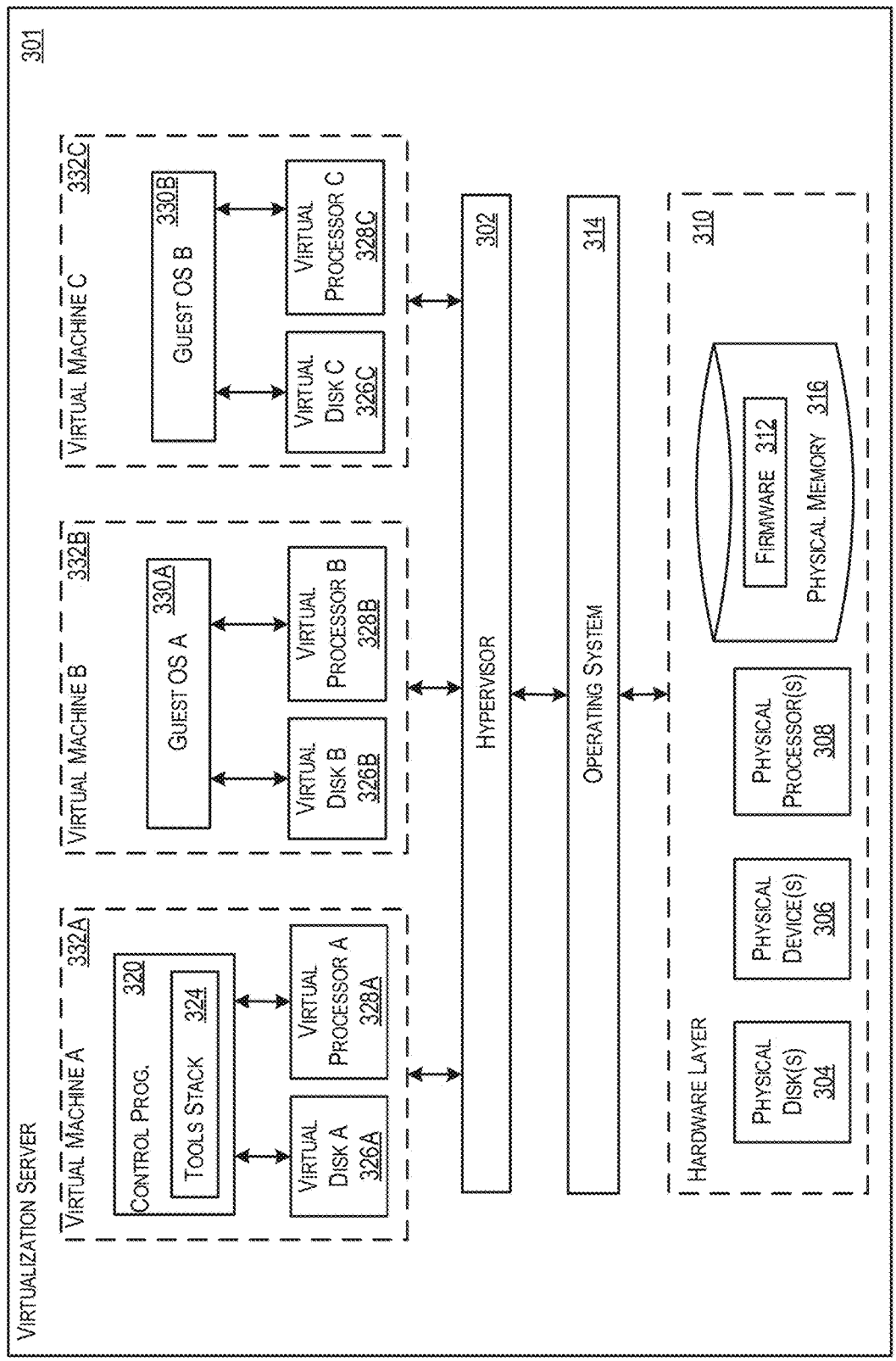
FIG. 3 depicts an illustrative computing system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, FL.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
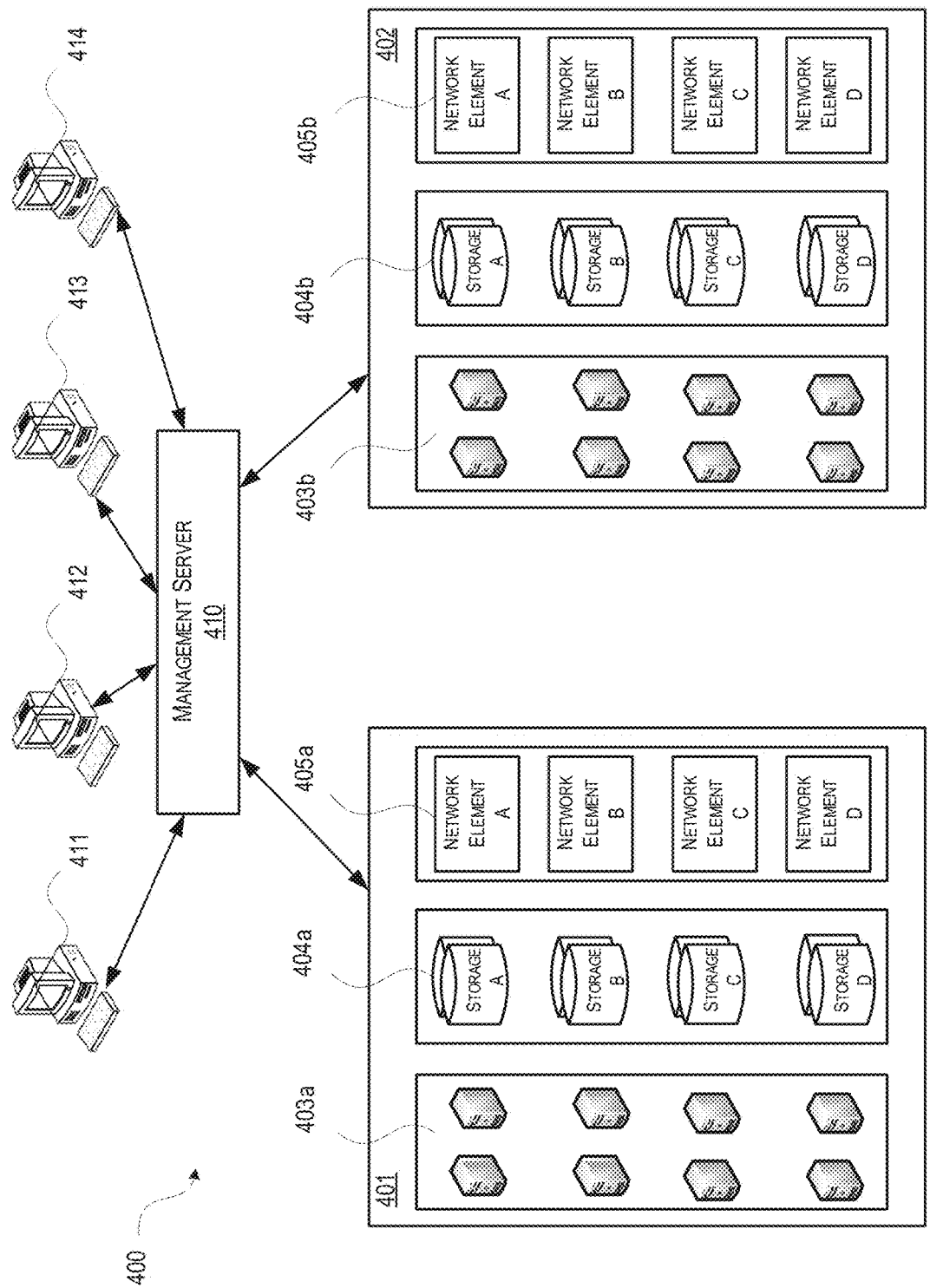
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

Bi-Directional Cross-Platform Incremental Image Updates

Figure 5:
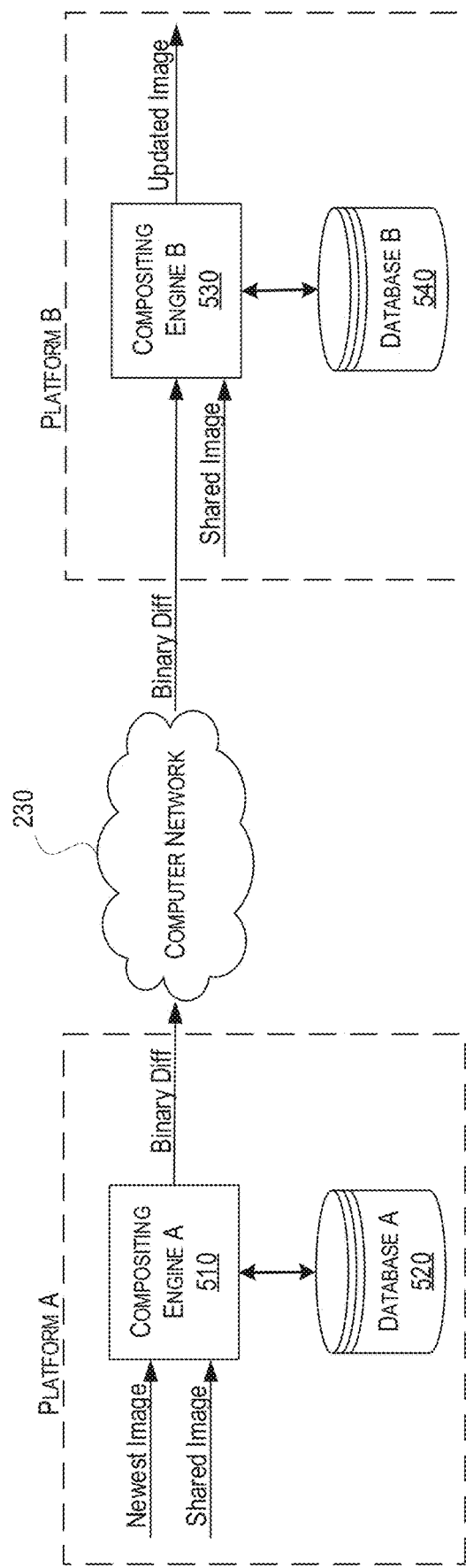
FIG. 5 depicts an illustrative platform architecture that may be used in accordance with one or more illustrative aspects described herein.

FIG. 5 depicts an illustrative platform architecture that may be used in accordance with one or more illustrative aspects described herein. As shown, platforms may communicate through computer network 230. Each platform may include a compositing engine (e.g., compositing engine A 510 or compositing engine B 530) and a database (e.g., database A 520 or database B 520). The platforms may be implemented or performed, for example, by one or more of the systems as discussed in connection with FIGS. 1-4. The platforms may operate in a networked environment, for example, transferring data over networks such as computer network 230 (e.g., the Internet). It will be appreciated that the network connections shown are illustrative and other means of establishing a communications link between the platforms may be used.

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

The platforms, for example, may be configured such that an update to any platform may be prepared for any of the other platforms. Incremental updates in a bi-directional manner may mean that updates done on any identified platform may then be prepared for another platform or any updates done for the other platform may be prepared for the identified platform. For example, FIG. 5 illustrates an incremental update from platform A to platform B but the incremental update could also be to other platforms or even from platform B to platform A.

Compositing engine A 510 may be configured to integrate an operating system, platform, and application layers into a single disk image. In some implementations, a compositing engine may work as a virtual machine that is an appliance virtual machine. Compositing engine A 510, for example, may be configured to attach or mount an image with updates (e.g., a newest image) that needs to be prepared for another platform (e.g., platform B). Compositing engine A 510 may further be configured to attach or mount a shared disk image between the platform of the updated image and a destination platform (e.g., platform B). Some non-limiting examples of a shared disk image between the platform of the updated image and the destination platform may be a disk image clone, a differencing disk image, a disk image snapshot, and so on. The compositing engine A 510 may be configured to locate the shared disk images by checking a database (e.g., database A 520) tracking previous versions of the relevant disk images. In another example, the shared disk images may be located by tracking previous versions of relevant disk images using co-located metadata. In another example, the shared disk images may be located by tracking previous versions of the relevant disk images through filename convention.

Compositing engine A 510 may be configured to calculate a binary diff between the newest image and a shared ancestor image (e.g., shared image). In some implementations, a binary diff is calculated between the newest image associated with the origination platform and the shared ancestor image (e.g., shared image). The compositing engine A 510 may be configured to calculate the binary diff by parsing and comparing blocks between the attached disk images and outputting the differences as the binary diff. In another example, compositing engine A 510 may be configured to calculate the binary diff by creating a signature file from the newest image, comparing the signature file to the shared image to create a delta file, and generate a binary diff file by comparing the delta file to the newest image.

Compositing engine A 510 may be configured to copy the binary diff over a network (e.g., computer network 230) to a destination platform (e.g., platform B).

Compositing engine B 530 may be configured to integrate an operating system, platform, and application layers into a single disk image. In some implementations, a compositing engine may work as a virtual machine that is an appliance virtual machine. Compositing engine B 530 may be configured to attach or mount the shared image and binary diff. Compositing engine B 530 may be configured to create an updated disk image (e.g., updated image). In order to create the updated disk image, compositing engine B 530 may be configured to generalize the shared image and the binary diff. In some implementations, generalizing the shared image and binary diff removes machine specific information. In some implementations, generalizing the shared image and binary diff removes instance-specific information. The compositing engine B 530 may be configured to apply platform specific files and operations to the generalized image to create an updated image (e.g., a virtual machine image) for the destination environment (e.g., platform B) that includes at least one, if not all, of the updates present in the binary diff.

Compositing engine B 540 may be configured to update the generalized image for the destination platform (e.g., platform B). In some implementations, updating the generalized image is done by applying platform specific files and operations to the updated image (e.g., a virtual machine image) to create a new version of the virtual machine image for the destination environment (e.g., platform B).

Database A 520 may be configured to store versioning information for images. In some implementations database A 520 may also store the versions of the images. The images may be, for example, platform A as well as other platforms. In some implementations, database A 520 may also be configured to store version history metadata associated with disk images, filenames of disk images, and the like. In some implementations, database A 520 may also be configured to store configuration files or configuration information. In some implementations, database A 520 may also be configured to store configuration parameters. Configuration parameters may include designated destination platforms for updates associated with the newest disk image (e.g., newest image). Another example of configuration parameters may include a preferred direction of updates between platforms. The preferred direction may be between one or more platforms to one or more other platforms. Another example of configuration parameters may include one or more costs associated with preparing an update between one or more platforms and one or more other platforms. Costs may take into account different cloud computing environment options for transferring files.

Database B 540 may be configured to store versioning information for images. In some implementations database B 540 may also store the versions of the images. The images may be, for example, platform B as well as other platforms. In some implementations, database B 540 may also be configured to store version history metadata associated with disk images, filenames of disk images, and the like. In some implementations, database B 540 may also be configured to store configuration files or configuration information. In some implementations, database B 540 may also be configured to store configuration parameters. Configuration parameters may include designated destination platforms for updates associated with the newest disk image (e.g., newest image). Another example of configuration parameters may include a preferred direction of updates between platforms. The preferred direction may be between one or more platforms to one or more other platforms. Another example of configuration parameters may include one or more costs associated with preparing an update between one or more platforms and one or more other platforms. Costs may take into account different cloud computing environment options for transferring files.

Figure 6:
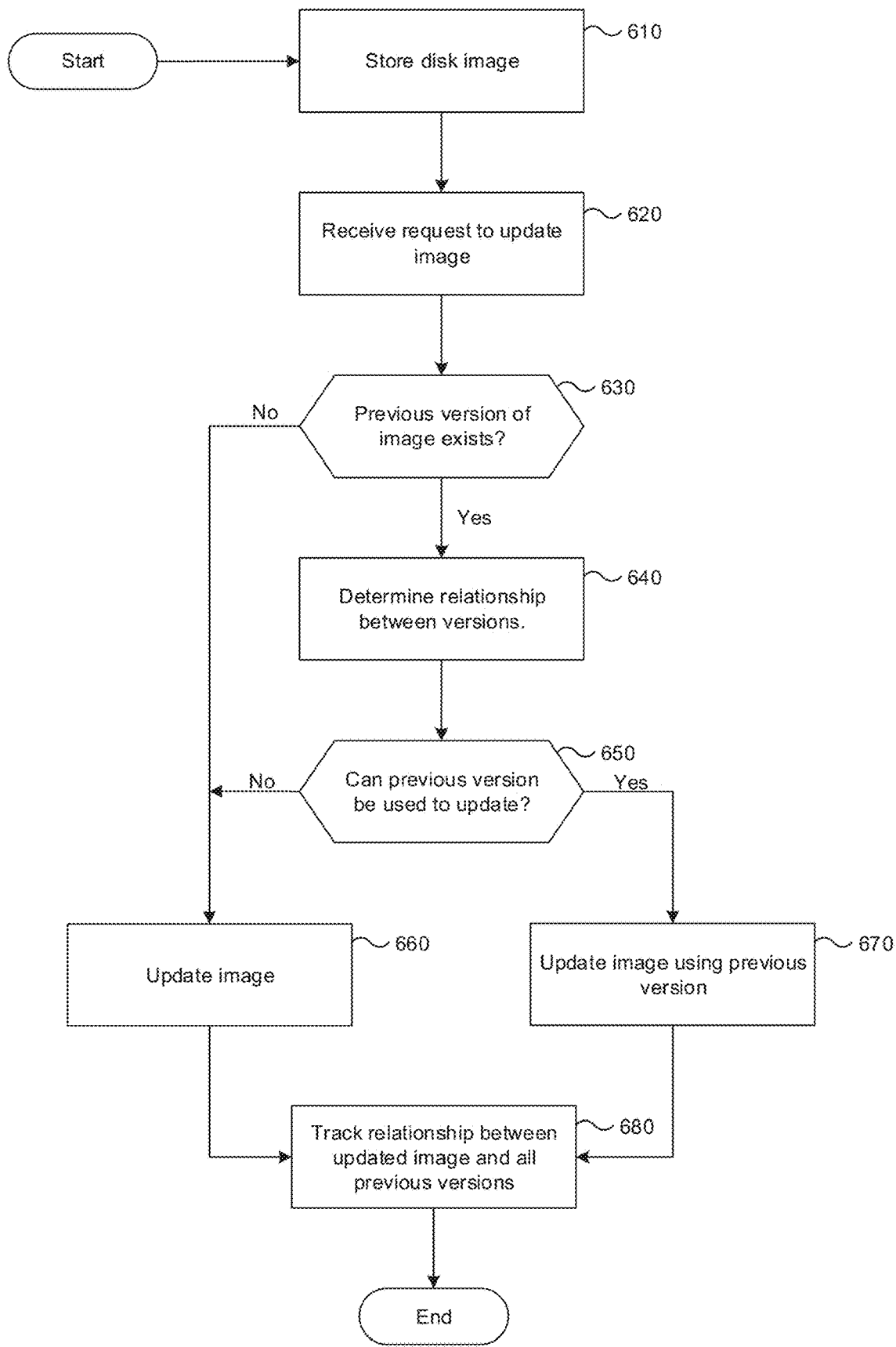
FIG. 6 depicts a flowchart showing an example method for updating a disk image and tracking relationships to previous versions for use in some implementations.

FIG. 6 depicts a flowchart showing an example method for updating a disk image and tracking relationships to previous versions for use in some implementations. The method may be implemented or performed, for example, by one or more of the systems as discussed in connection with FIGS. 1-5. The method may be implemented or performed, for example, by one or more computing devices. The steps of the method may be described as being performed by particular components and/or computing devices for the sake of simplicity, but the steps may be performed by any component and/or computing device, or by any combination of one or more components and/or one or more computing devices. The steps of the method may be performed by a single computing device or by multiple computing devices. One or more steps of the method may be omitted, added, rearranged, and/or otherwise modified as desired by a person of ordinary skill in the art.

The steps depicted in FIG. 6 may include storing a disk image by a computing device as described above (610). The computing device may receive a request to update the disk image (620). The computing device may check to see if previous versions of the disk image exist (630). If previous versions of the disk image do not exist, then the process proceeds to update the disk image (660). If previous versions of the disk image exist, then the method proceeds to determine the relationship between the versions (640). The computing device may check to see if one or more previous versions can be used to update the disk image (650). If the one or more previous versions cannot be used to update the disk image, then the process proceeds to update the disk image without using a previous version (660). If the one or more previous versions can be used to update the disk image, then the process proceeds to update the disk image using the previous version(s) (670). Then the computing device may track the relationship between the updated image and previous versions (680).

Still referring to FIG. 6 and in more detail, the computing device may store a disk image (610). In some implementations, the disk image may be stored in a fashion that allows access to previous versions of the disk image. Some non-limiting examples of storing the disk image may include disk image cloning, differencing disk images, or disk image snapshots. For example, disk image cloning may include saving versions of disk images as a disk clone. A disk clone may save exact, uncompressed replicas of the disk image. In another example, differencing disks may include images that store changes made to another disk image. In some implementations, differencing disks may be a child image that is stored together with a parent image. Differencing disks may also include a more complicated hierarchical structure including parents, siblings, children, etc. In another example, disk image snapshots may include capturing versions of the disk image at the time of the snapshot and creating one or more differencing images for any ongoing write operations.

The computing device may receive a request to update the disk image (620). In some implementations, the request may be based on updates to a different disk image. For example, there may be a request to update an image in one environment based on updates already applied to an image in another environment. The updates may not be able to be applied directly to the environment specific version in that other environment because the updates are block-level differences, and any changes made since the differences were calculated were made at a higher level (e.g., at the filesystem level).

The request may also be reversed, where the request is to update the image in the first environment based on updates to the image in the second environment. In some implementations, the request may be to update the image in any environment of a plurality of environments based on an image in any other environment of the plurality of environments, where the changes are propagated automatically and transparently and with the smallest possible set of blocks transferred between environments. In other words, the disk image updates may be bi-directional, where any of the disk images may be updated and the changes prepared to any of the other disk images of a plurality of disk images. The request to update the disk image may be an update that is not a part or has been applied to any disk images in a plurality of environments. For example, the update is first being applied to a first disk image of disk images in a plurality of environments. The updates may then be applied to one or more of the other disk images in the plurality of environments. In some implementations, an administrator may indicate through a configuration which platform of a plurality of platforms should have the image updates prepared for. Updates may comprise new files, applications, drivers, security updates, and the like.

The computing device may check to see if previous versions of the disk image exist (630). Some non-limiting examples of checking for previous versions of the disk image may comprise checking for disk image clones, checking for differencing disk images, checking for disk image snapshots, and so on. The checking for previous versions may be done by accessing and checking a version history, accessing and checking metadata associated with the disk image, accessing and checking a database containing version information, tracking through filename conventions, and the like.

If previous versions of the disk image do not exist (630:NO), then the process proceeds to update the disk image (660). The disk image may have to be updated with new updates without benefit of utilizing a shared ancestor version between two disk images allowing for a transfer of only a binary file of differences between the shared ancestor version and a source version containing the desired updates. A shared ancestor version of a disk image may be a common parent disk image to both a disk image that is the source of the desired updates and a disk image to which the updates will be applied. Updates without benefit of utilizing a shared version may require the transfer of an entire disk image comprising the required updates from a single golden image and/or authoring environment. In some examples, it may not be possible to proceed with the update if no previous versions of the disk image exist as there can be no shared ancestor disk version. If previous versions of the disk image exist (630:YES), then the process proceeds to determine a relationship, correlation, association or other affiliation between the versions (640). In some implementations, determining the relationship between versions may comprise determining whether there is a shared version (i.e., shared ancestor image) between two disk images. For example, a version of a disk image to be updated may be found that is a shared ancestor version with a version of a disk image from which the updates are being prepared from. Determining the relationship between versions may be done by checking a database tracking previous version of the relevant disk images. In another example, the shared disk images may be located by tracking previous versions of relevant disk images using co-located metadata. In another example, the shared disk images may be located by tracking previous versions of the relevant disk images through filename convention.

The computing device may check to see if one or more previous versions of the disk image can be used to update the disk image (650). In some implementations, determining if one or more previous versions of the disk image can be used to update the disk image is consequent to determining the relationship between versions. For example, if a relationship has been determined such that a version is found which is a shared ancestor version of a disk image with a version of a disk image from which the updates are being prepared from, a determination may be made that the shared ancestor version may be used to update the disk image. In some implementations, the shared ancestor version must be available to the destination platform using the disk image to be updated. In one example, a determination is made that the shared ancestor version is available to the destination platform without having to transfer the shared ancestor version of the disk image to the destination platform over a network and/or the internet. In another example, a determination is made that a shared ancestor version of a disk image is not available to the destination platform without having to transfer over a network and/or the internet and therefore there is no shared ancestor version of the disk image that can be used. In another example, no version is found which is a shared ancestor version of a disk image with a version of a disk image from which the updates are being prepared from and a determination is made that there are no previous versions of the disk image that can be used to update the disk image.

If one or more previous version of the disk image cannot be used to update the disk image (650:NO), then the process proceeds to update the disk image (660). The disk image may have to be updated with new updates without benefit of utilizing a shared version between two disk images. In some examples, it may not be possible to proceed with the update if no previous versions of the disk image exist as there can be no shared ancestor disk version. For example, there may be a policy or a configuration that requires the use of a shared ancestor disk version for use in updating to avoid unnecessary network or internet traffic. If it is not possible to proceed with an update, a warning flag may be set or a warning message sent. If the one or more previous versions of the disk image can be used to update the disk image (650:YES), then the process proceeds to update the disk image using the previous version(s) (670). In some implementations, the previous version is a shared ancestor version between the disk image being updated and the disk image being used as the source of the updates. The differences between the shared ancestor version and the disk image from which the updates are being prepared from are used to update the disk image. In this way, image updates may be bi-directional where a disk image in a first environment may be updated by a disk image from any other environment as long as a shared ancestor version of the two disk images is available. In some implementations, the disk image may be updated by finding a shared ancestor image. The shared ancestor image may be located on a destination platform or be easily accessible to the destination platform. In some implementations, determining that an available image is a shared ancestor image may be done by accessing and checking a version history of the available images, accessing and checking metadata associated with available images, accessing and checking a database containing version information about the available images, tracking available images through filename conventions, and the like.

The newest version of the disk image to be updated and the shared ancestor image may be attached to an appliance virtual machine. In some implementations, the newest version of the disk image to be updated and the shared ancestor image are attached to a compositing engine. In some implementations, a compositing engine functions to integrate an operating system, platform, and application layers into a single disk image. In other words, a compositing engine may work as a virtual machine that is an appliance virtual machine where the appliance is used to generate an updated disk image using the shared ancestor image. A binary diff is calculated between the newest version of the disk image containing the desired updates and the shared ancestor image. In some examples, the binary diff is calculated on and is located on the system comprising the destination environment and the binary diff then exists in the destination environment. In some examples, the binary diff is copied (e.g., over a network) to a destination environment. A virtual machine (e.g., an appliance virtual machine) may be created in the destination environment where the binary diff and the shared ancestor image are attached to the virtual machine. The virtual machine may apply the differences to the shared ancestor image by generalizing the virtual machine image and applying platform specific files and operations to the virtual machine image to create a new version of the virtual machine image for the destination environment. In some implementations, generalizing the virtual machine image removes machine specific information. In some implementations, generalizing the virtual machine image removes instance-specific information.

After the disk image is updated, the process may track the relationship between the updated disk image and previous versions (680). Some non-limiting examples of tracking the relationship may include tracking in a database, tracking through co-located metadata, tracking through filename convention, and the like. In some implementations, tracking the relationship between the updated disk image and previous versions allows for later checking of any shared disk images between a platform with an updated image and a destination platform. In one example a disk image may be stored and tracked as a disk image clones. In another example, a disk image may be stored and tracked as a differencing disk image. In another example, a disk image may be stored and tracked as a disk image snapshot, and so on.

Figure 7:
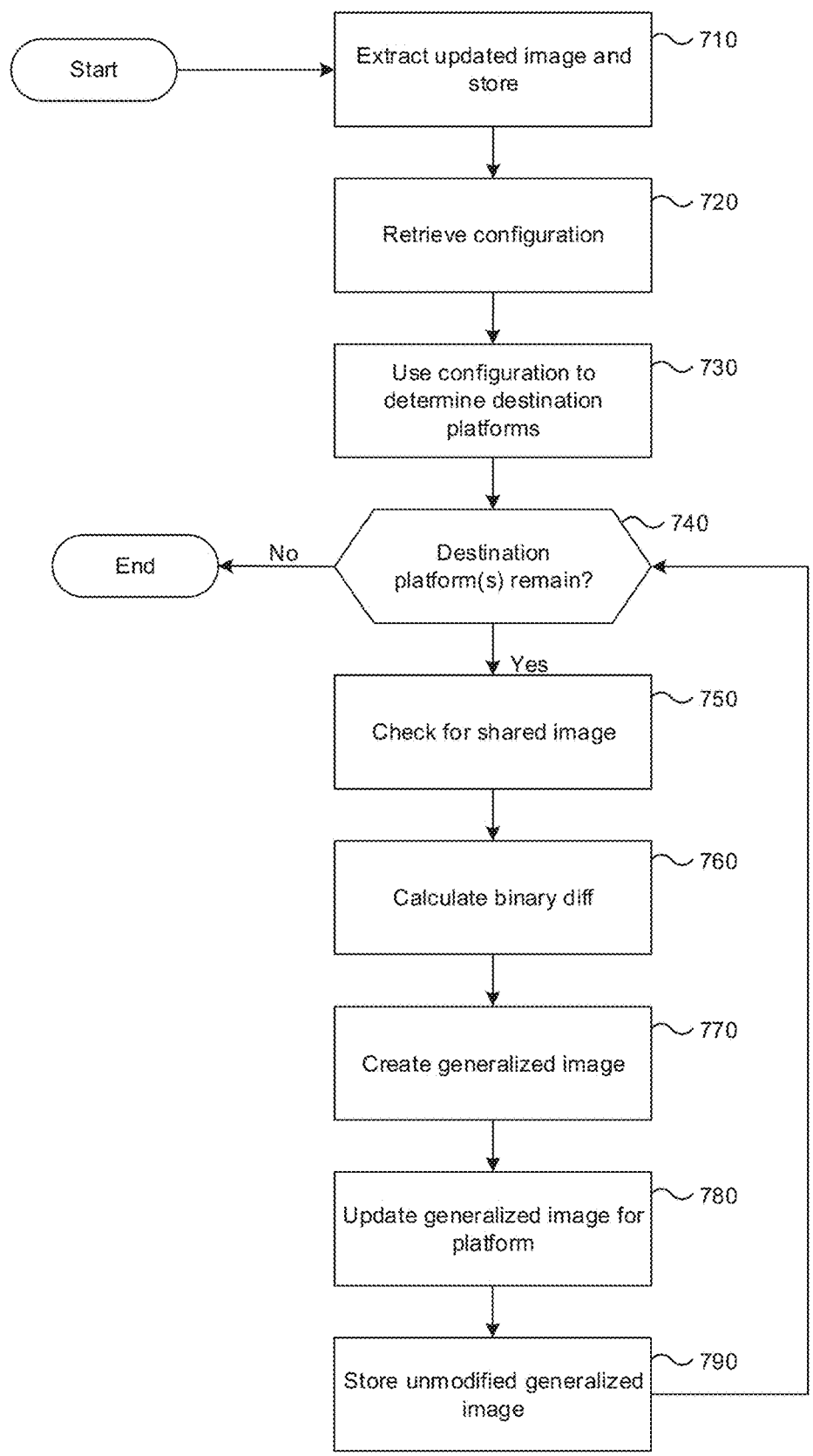
FIG. 7 depicts a flowchart showing an example method for updating a disk image based on a shared disk image for use in some implementations.

FIG. 7 depicts a flowchart showing an example method for updating a disk image based on a shared disk image for use in some implementations. The method may be implemented or performed, for example, by one or more of the systems as discussed in connection with FIGS. 1-5. The method may be implemented or performed, for example, by one or more computing devices. The steps of the method may be described as being performed by particular components and/or computing devices for the sake of simplicity, but the steps may be performed by any component and/or computing device, or by any combination of one or more components and/or one or more computing devices. The steps of the method may be performed by a single computing device or by multiple computing devices. One or more steps of the method may be omitted, added, rearranged, and/or otherwise modified as desired by a person of ordinary skill in the art.

The steps depicted in FIG. 7 may include extracting and storing an updated disk image by a computing device as described above (710). The computing device may retrieve a configuration associated with using the updated disk image (720). The computing device may use the configuration to determine destination platforms (730). The computing device may check to see if any destination platforms are left to update (740). If no destination platforms are left, the process ends. If destination platforms to update are still left, then the process proceeds to check for a shared disk image between the updated image and the destination platform (750). The computing device may calculate a binary file of differences (i.e., a binary diff file) between the updated image and a shared ancestor disk image (760). The computing device may then create a generalized disk image (770), update the generalized image for the destination platform (780), and store an unmodified copy of the generalized image (790). The computing device may then check to see if any additional destination platforms remain (740).

Still referring to FIG. 7 and in more detail, the computing device may extract, isolate, or otherwise separate and store contents of an already updated disk image (710). Extracting, isolating, or otherwise separating and storing contents of the already updated disk image may comprise extracting individual files stored in the disk image. The extracted contents may be stored on shared storage. In some implementations, the updated disk image may first be attached to a virtual machine (e.g., an appliance virtual machine) or a compositing engine prior to extraction of the contents of the updated disk image.

The computing device may retrieve data about a configuration of the updated disk image (720). In some implementations, a configuration may be set by an administrator. The data may comprise a configuration file or a configuration database. The configuration file or database may be stored on an administration system. In some implementations, individual computing platforms or systems may store their own respective configuration file or database. In some implementations, the data may be a software program or application which is dynamically controls some configuration parameters and make determinations based on preparation efficiency, preparation cost, and the like. Configuration parameters may include designated destination platforms for updates associated with the updated disk image. Another example of configuration parameters may include a preferred direction of updates between platforms. The preferred direction may be between one or more platforms to one or more other platforms. Another example of configuration parameters may include one or more costs associated with preparing an update between one or more platforms and one or more other platforms. Costs may take into account different cloud computing environment options for transferring files.

The computing device may use the configuration to determine destination platforms (730). In some implementations, the configuration may set or indicate which platforms an image update should be prepared for. The configuration may set a preferred direction for preparation of updates from one or more platforms to one or more other platforms. The configuration may be set at the level of each platform to indicate a preferred update preparation direction for each respective platform. In some implementations, a configuration may track multiple cloud environments and track the cheapest way to prepare updates from a first platform to a second platform. This may be accomplished via configuration parameters. The configuration may keep track of a plurality of destination platforms to be updated using a particular updated disk image as the source of the updates.

The computing device may check to see if any destination platforms are left to update (740). In some implementations, there may be a plurality of destination platforms to which the updates are being prepared for. If no destination platforms are left to update (740:NO), the process ends. If destination platforms to update are still left (740:YES), then the process proceeds to check for a shared disk image between the platform of the updated image and the destination platform (750). Some non-limiting examples of checking for a shared disk image between the platform of the updated image and the destination platform may comprise checking for disk image clones, checking for differencing disk images, checking for disk image snapshots, and so on. These may be cross referenced for shared disk images by checking a database tracking previous version of the relevant disk images. In another example, the shared disk images may be located by tracking previous versions of relevant disk images using co-located metadata. In another example, the shared disk images may be located by tracking previous versions of the relevant disk images through filename convention. Other ways of cross-referencing for shared ancestor disk images by be used and known by those skilled in the art.

The computing device may calculate a binary diff between the updated image and a shared ancestor disk image (760). In some implementations, a binary diff is calculated between the newest version of the disk image associated with the origination platform and the shared ancestor image. In some examples, the binary diff is calculated on and is located on the system comprising the destination environment and the binary diff then exists in the destination environment. In some examples, the binary diff is copied (e.g., over a network) to a destination environment.

The computing device may then create a generalized disk image (770). In some implementations, a virtual machine (e.g., an appliance virtual machine) may be created in the destination environment where the binary diff and the shared ancestor image are attached. The virtual machine may then create a generalized disk image by creating a virtual machine image using the binary diff and the shared ancestor image and then generalizing the virtual machine image. Generalizing the virtual machine image may be accomplished by removing machine specific information from the virtual machine image. In some implementations, generalizing is accomplished by deleting machine-specific files and data. In some implementations, an intermediate state may be stored where a new version of the disk image specific to the original environment containing the updated disk image has been created. This new version of the disk image specific to the original environment would comprise the shared ancestor image combined with the differencing data from the binary diff prior to generalizing.

The computing device may update the generalized image for the destination platform (780). In some implementations, updating the generalized image is done by applying platform specific files and operations to the virtual machine image to create a new version of the virtual machine image for the destination environment. A virtual machine (e.g., an appliance virtual machine) may be used to apply platform specific files and operations to the virtual machine image to create the new version of the virtual machine image for the destination environment.

The computing device may store an unmodified copy of the generalized image (790). The storing of the disk images in this fashion may be accomplished by any means known to a person of skill in the art. Some non-limiting examples of storing the disk image may include disk image cloning, differencing disk images, or disk image snapshots as discussed in more detail above. The computing device may then return to step 740 to check to see if any additional destination platforms remain.

Figure 8:
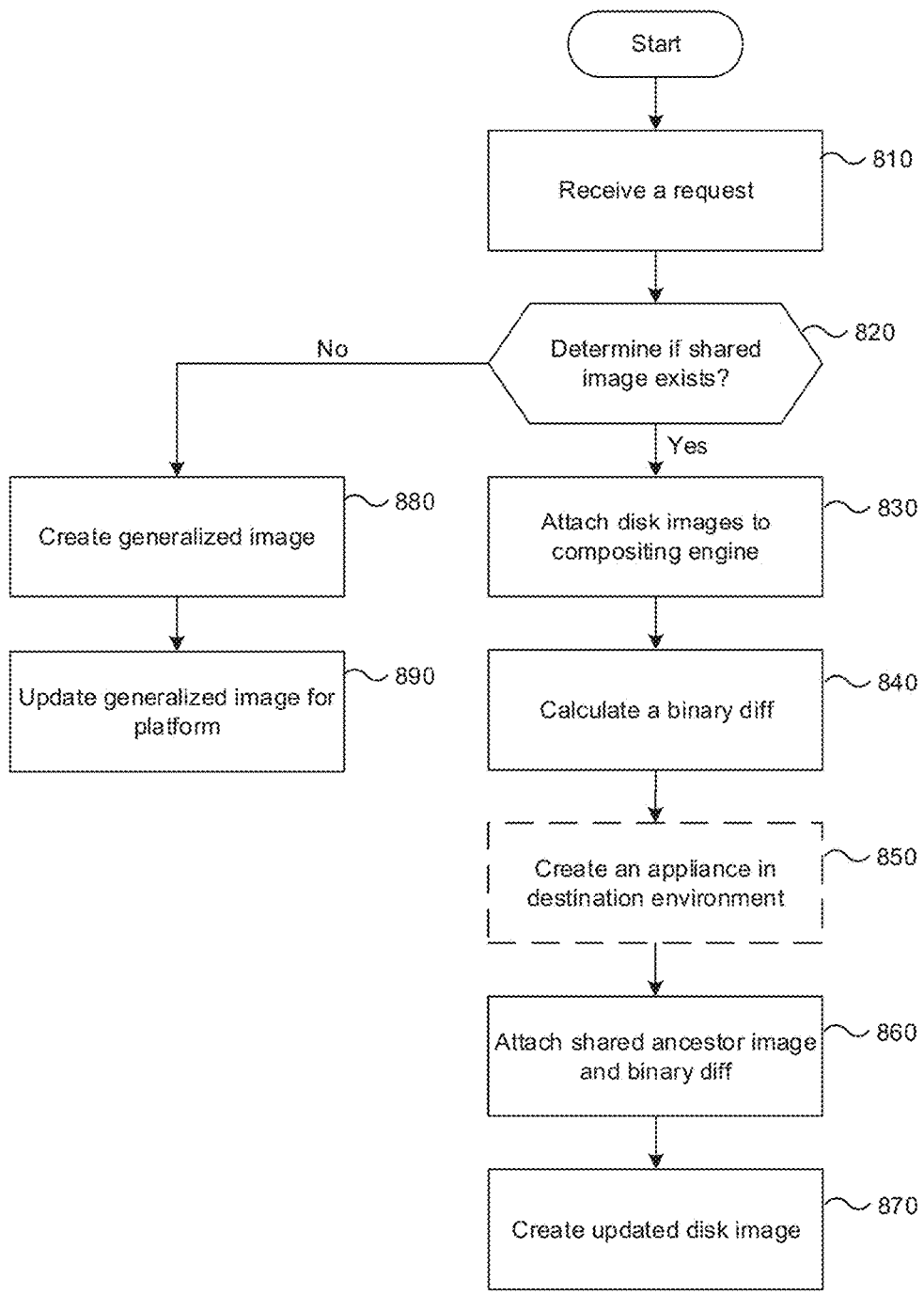
FIG. 8 depicts a flowchart showing an example method for detailed steps for updating a disk image to create a new disk image for use in some implementations.

FIG. 8 depicts a flowchart showing an example method for detailed steps for updating a disk image to create a new disk image for use in some implementations. The method may be implemented or performed, for example, by one or more of the systems as discussed in connection with FIGS. 1-5. The method may be implemented or performed, for example, by one or more computing devices. The steps of the method may be described as being performed by particular components and/or computing devices for the sake of simplicity, but the steps may be performed by any component and/or computing device, or by any combination of one or more components and/or one or more computing devices. The steps of the method may be performed by a single computing device or by multiple computing devices. One or more steps of the method may be omitted, added, rearranged, and/or otherwise modified as desired by a person of ordinary skill in the art.

The steps depicted in FIG. 8 may include receiving a request to update a disk image (810). The computing device may determine if a shared disk image exists (820). If a shared disk image does not exist, the process may end. If a shared disk image does exist, the computing device may attach disk images to a compositing engine (830). The computing device may calculate a binary diff between the attached disk images (840). Optionally, the computing device may create an appliance in the destination environment (850). The computing device may attach the shared ancestor image and binary diff to the appliance (860). Finally, the computing device may create an updated disk image (870).

Still referring to FIG. 8 and in more detail, the computing device receives a request to update a disk image (810). In some implementations, the request may be based on updates to a different disk image. For example, there may be a request to update an image in one environment based on updates already applied to an image in another environment. The updates may not be able to be applied directly to the environment specific version in that other environment because the updates are block-level differences, and any changes made since the differences were calculated were made at a higher level (e.g., at the filesystem level). The request may also be reversed, where the request is to updated the image in the first environment based on updates to the image in the second environment. In some implementations, the request may be to update the image in any environment of a plurality of environments based on an image in any other environment of the plurality of environments, where the changes are propagated automatically and transparently and with the smallest possible set of blocks transferred between environments. In other words, the disk image updates may be bi-directional, where any of the disk images may be updated and the changes prepared for any of the other disk images of a plurality of disk images. The request to update the disk image may be an update that is not a part or has been applied to any disk images in a plurality of environments. For example, the update is first being applied to a first disk image of disk images in a plurality of environments. The updates may then be applied to one or more of the other disk images in the plurality of environments. In some implementations, an administrator may indicate through a configuration which platform of a plurality of platforms should have the image updates prepared for. Updates may comprise new files, applications, drivers, security updates, and the like.

The computing device may determine if a shared disk image exists (820). Some non-limiting examples of checking for previous versions of the disk image may comprise checking for disk image clones, checking for differencing disk images, checking for disk image snapshots, and so on. The checking for previous versions of a disk image clone may be done by accessing and checking a version history, accessing and checking metadata associated with the disk image, accessing and checking a database containing version information, tracking through filename conventions, and the like where a disk image clone is a one to one copy of a disk image. The checking for previous versions of a differencing disk image may be done by accessing and checking a version history, accessing and checking metadata associated with the disk image, accessing and checking a database containing version information, tracking through filename conventions, and the like where a differencing disk image is an image that stores changes made to a previous disk image and is used in conjunction with that previous disk image. The checking for previous versions of a disk image snapshot may be done by accessing and checking a version history, accessing and checking metadata associated with the disk image, accessing and checking a database containing version information, tracking through filename conventions, and the like where a disk image snapshot is a full read-only copy of a disk image. If a shared disk image does not exist, the process may continue to step 880 (820:NO). If a shared disk image does exist, the computing device may continue on to step 830 (820:YES).

The computing device may optionally attach or otherwise mount disk images to a compositing engine (830). In some implementations, the shared disk image and the newest image of the disk contained the desired updates is attached to the compositing engine.

The computing device may calculate a binary diff between the attached disk images (840). In some implementations, a binary diff is calculated between the newest version of the disk image containing desired updates and the shared ancestor image. In one example, a binary diff is calculated by parsing and comparing blocks between the attached disk images and outputting the differences as the binary diff. In another example, a binary diff is calculated by creating a signature file from a first disk image of the attached disk images, comparing the signature file to the other attached disk image to create a delta file, and generate a binary diff file by comparing the delta file to the first disk image. In some examples, the binary diff is calculated on and is located on the system comprising the destination environment and the binary diff then exists in the destination environment. In some examples, the binary diff is copied (e.g., over a network) to a destination environment.

The computing device may optionally create an appliance in the destination environment (850). In some implementations, an appliance may already exist in the destination environment. In some implementations, an appliance virtual machine may be created in the destination environment. The appliance virtual machine may be a pre-configured virtual machine image ready to run in the destination environment.

The computing device may attach the shared ancestor image and binary diff to the appliance (860). In some implementations, attaching the shared ancestor image may comprise mounting the shared ancestor image and an image comprising the binary diff to the appliance.

The computing device may create an updated disk image (870). In some implementations, an updated disk image is created by generalizing the combined ancestor image and binary diff. In some implementations, generalizing the combined ancestor image and binary diff removes machine specific information. In some implementations, generalizing the combined ancestor image and binary diff removes instance-specific information. Then platform specific files and operations may be applied to the generalized image to create a virtual machine image for the destination environment that includes at least one, if not all, of the updates present in the binary diff.

If a shared disk image does not exist (820:NO), the process may continue to step 880 and the computing device may create a generalized disk image of an entire disk image that contains all the updates. In some implementations, an appliance virtual machine may be created in the destination environment where the disk image that contains all the updates is attached. The appliance virtual machine may then create a generalized disk image by creating a virtual machine image using disk image that contains all the updates and then generalizing the virtual machine image. Generalizing the virtual machine image may be accomplished by removing machine specific information from the virtual machine image. In some implementations, generalizing is accomplished by deleting machine-specific files and data.

The computing device may update the generalized image for the destination platform (890). In some implementations, updating the generalized image is done by applying platform specific files and operations to the virtual machine image to create a new version of the virtual machine image for the destination environment. An appliance virtual machine may be used to apply platform specific files and operations to the virtual machine image to create the new version of the virtual machine image for the destination environment.

Figure 9:
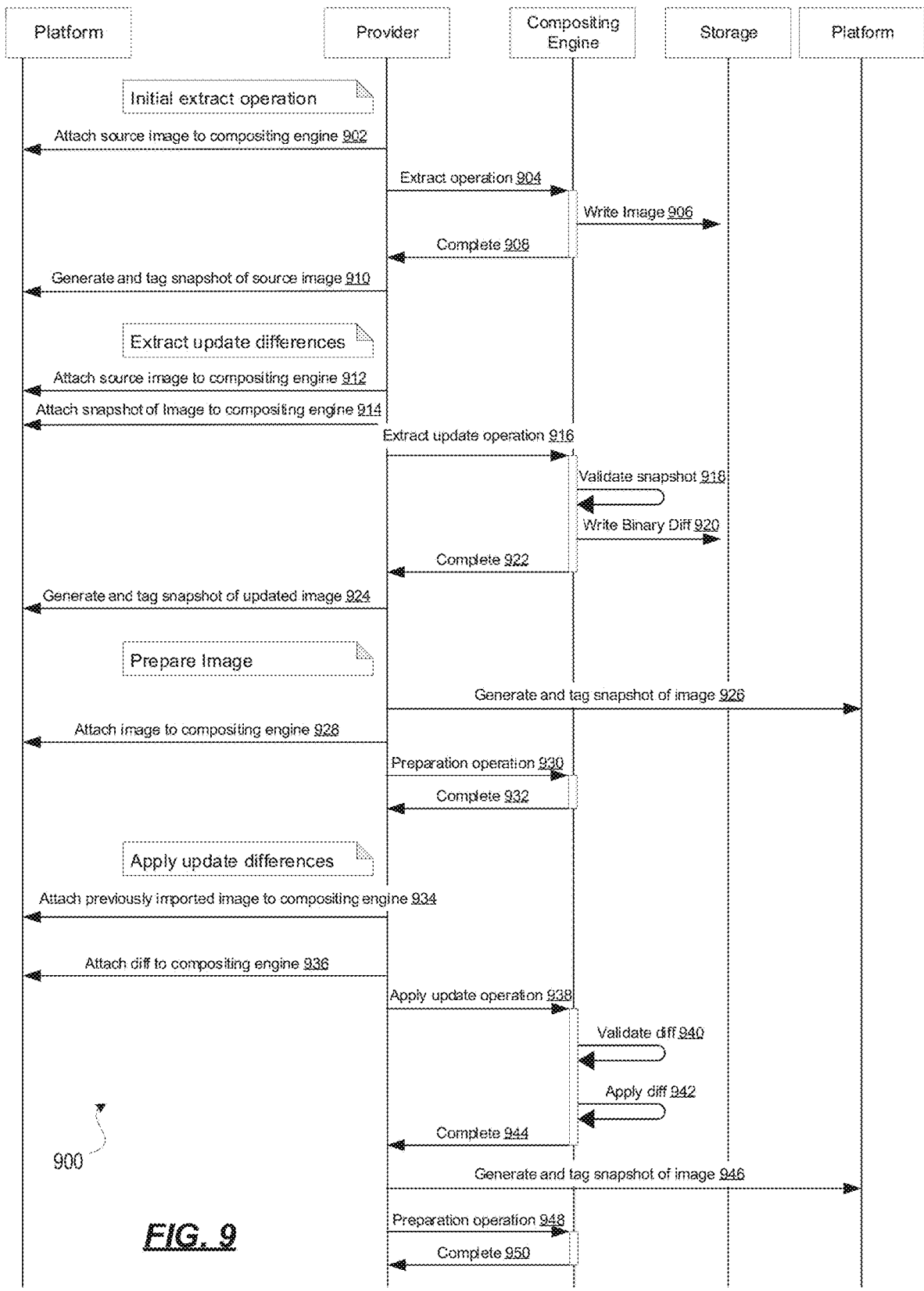
FIG. 9 depicts a schematic representation of data movement for preparing updates from one environment to another for use in some implementations.

FIG. 9 depicts a schematic representation 900 of data movement for preparing updates from one environment to another for use in some implementations.

Initial Extract Operation

In step 902, a provider of a source disk image attaches a source image to a compositing engine. The compositing engine may be of a computing platform. The platform may comprise the disk image with the updates that will be prepared for a different platform. The source disk image may comprise the desired updates that need to be upgraded to one or more other platforms.

In step 904, data is extracted from the source image. The data may be extracted by the compositing engine. In some implementations, the data is extracted in a canonical format.

In step 906, the extracted contents may be stored in computer storage. In some implementations, shared storage may be used that is accessible by a plurality of platforms.

In step 908, an indication of completion is sent. In some implementations, the completed indication may be sent from the compositing engine. The completion indication may be sent to an administrative computing system controlling the cross-platform image update. The completion indication may be a set flag, a sent message, and the like.

In step 910, a snapshot of the source image is generated and tagged. In one example, a disk image snapshot is a full read-only copy of a disk image. In some implementations, tagging may include associating a disk image with identifying information. Identifying information include a platform the image has been generated for. In some implementations, the identifying information may further include version numbers, one or more references to the update or updates that are part of the disk image, and the like. In some implementations, other ways of capturing the source image may be utilized including disk image clones, differencing disk images, and the like. The snapshot that has been generated and tagged may be sent to the platform originating the updates.

Extract Update Differences

In step 912, a provider of a source disk image attaches a source image to a compositing engine. In step 914, the provider attaches the snapshot of the source image containing desired updates to the compositing engine.

In step 916, the updates are extracted by the compositing engine by validating the snapshot (918) and writing or otherwise recording a binary diff to storage (920). In some implementations, validating the snapshot comprises validating a disk image associated with the snapshot. Validating the disk image may include verifying an integrity of the disk image to ensure there has been no corruption of the data. In some examples, validating the disk image includes comparing hash data of some or all of the disk image and the data used to create the disk image. For example, an MD5 hash, SHA-11 hash, or the like may be used.

In step 922, an indication of completion is sent. In some implementations, the completed indication may be sent from the compositing engine. The completion indication may be sent to an administrative computing system controlling the cross-platform image update. The completion indication may be a set flag, a sent message, and the like.

In step 924, a snapshot of the updated image is generated and tagged. In some implementations, tagging may include associating a disk image with identifying information. Identifying information include a platform the image has been generated for. In some implementations, the identifying information may further include version numbers, one or more references to the update or updates that are part of the disk image, and the like. In some implementations, other ways of capturing the source image may be utilized including disk image clones, differencing disk images, and the like.

Prepare Image

In step 926, a provider of a source disk image generates and tags a snapshot of the image. In some implementations, the snapshot is of a disk image to be updated. In some implementations, tagging may include associating a disk image with identifying information. Identifying information include a platform the image has been generated for. In some implementations, the identifying information may further include version numbers, one or more references to the update or updates that are part of the disk image, and the like.

In step 928, the provider attaches the snapshot of the image to be updated to a compositing engine. The compositing engine may be associated with a platform. The image may comprise a disk image that needs to have one or more desired updates applied.

In step 930, the updated image is prepared using the compositing engine. Data preparation may comprise updating a disk image with platform specific data and files.

In step 932, an indication of completion is sent. In some implementations, the completed indication may be sent from the compositing engine. The completion indication may be sent to an administrative computing system controlling the cross-platform image update. The completion indication may be a set flag, a sent message, and the like.

Apply Update Differences

In step 934, a provider of a source disk image attaches a source image to a compositing engine. The compositing engine may be associated with a platform. The image may comprise a disk image that needs to have one or more desired updates applied.

In step 936, the provider attaches the binary diff to the compositing engine. The binary diff may comprise a disk image comprising the differences between a shared ancestor disk image and a disk image comprising desired updates. In some implementations, validating the snapshot comprises validating a disk image associated with the snapshot. Validating the disk image may include verifying an integrity of the disk image to ensure there has been no corruption of the data. In some examples, validating the disk image includes comparing hash data of some or all of the disk image and the data used to create the disk image. For example, an MD5 hash, SHA-11 hash, or the like may be used.

In step 938, the update operation is performed by the compositing engine by validating the binary diff (940) and applying the binary diff (942). Validating the binary diff image may include verifying an integrity of the binary diff to ensure there has been no corruption of the data. In some examples, validating the binary diff includes comparing hash data of some or all of the binary diff and the data used to create the binary diff. For example, an MD5 hash, SHA-11 hash, or the like may be used.

In step 944, an indication of completion is sent. In some implementations, the completed indication may be sent from the compositing engine. The completion indication may be sent to an administrative computing system controlling the cross-platform image update. The completion indication may be a set flag, a sent message, and the like.

In step 946, a provider of a source disk image generates and tags a snapshot of the updated image to the new platform. In some implementations, other ways of capturing the source disk image may be utilized including disk image clones, differencing disk images, and the like. In some implementations, tagging may include associating a disk image with identifying information. Identifying information include a platform the image has been generated for. In some implementations, the identifying information may further include version numbers, one or more references to the update or updates that are part of the disk image, and the like.

In step 948, the updated image is prepared using the compositing engine. Data preparation may comprise updating a disk image with platform specific data and files.

In step 950, an indication of completion is sent. In some implementations, the completed indication may be sent from the compositing engine. The completion indication may be sent to an administrative computing system controlling the cross-platform image update. The completion indication may be a set flag, a sent message, and the like.

The following paragraphs (M1) through (M8) describe examples of methods that may be implemented in accordance with the present disclosure.

(M1) A method, executing on a computing device, comprising: identifying an image in response to receipt of a request to prepare updates between disk images of different computing environments running on computing devices, the image being a common disk image between previous versions of the disk images; determining a binary file of differences between a disk image of one of the computing devices and the identified image; attaching, using another of the computing devices, the image and the binary file of differences to an appliance executable on that device; and creating, using the another of the computing devices, another disk image by applying, using the appliance and the binary file of differences, differences to the identified image.

(M2) A method may be performed as described in paragraph (M1) further comprising: generalizing the another disk image; and applying platform specific files and operations to the generalized another disk image.

(M3) A method may be performed as described in any of paragraphs (M1) through (M2) wherein (a) the image and the identified image are attached to a compositing engine, (b) the appliance is created on the another of the computing devices and (c) the preparation is reversible after any updates to the disk image running on the another of the computing devices.

(M4) A method may be performed as described in any of paragraphs (M1) through (M3) wherein creating the another disk image is done on the another of the computing devices consequent to receiving the binary file of differences by the another of the computing devices.

(M5) A method may be performed as described in any of paragraphs (M1) through (M4) further comprising: tracking versions of the disk images of different computing environments running on computing devices; and wherein creating the another disk image creates a new version of the another disk image operating on the another of the computing devices; and the new version of the another disk image operating on the another of the computing devices is added to the tracked version of the another disk image operating on the another of the computing devices.

(M6) A method may be performed as described in any of paragraphs (M1) through (M5) wherein versions are tracked using at least one of image cloning, differencing disks, or snapshots.

(M7) A method may be performed as described in any of paragraphs (M1) through (M6) wherein the image and the another disk image respectively exist on at least one of a hypervisor or a cloud platform.

(M8) A method may be performed as described in any of paragraphs (M1) through (M7) wherein previous versions of images of each of the image and the another disk image are accessible.

The following paragraphs (A1) through (A8) describe examples of computing devices that may be implemented in accordance with the present disclosure.

(A1) A computing device comprising: one or more processors; and memory storing instructions that, when executed by the one or more processors, cause the computing device to: identify an image in response to receipt of a request to prepare updates between disk images of different computing environments running on computing devices, the image being a common disk image between previous versions of the disk images; determine a binary file of differences between a disk image of one of the computing devices and the identified image; attach, using another of the computing devices, the image and the binary file of differences to an appliance executable on that device; and create, using the another of the computing devices, another disk image by applying, using the appliance and the binary file of differences, differences to the identified image.

(A2) A computing device may be implemented as described in paragraph (A1) the memory further storing instructions that, when executed by the one or more processors, cause the computing device to: generalize the another disk image; and apply platform specific files and operations to the generalized another disk image.

(A3) A computing device may be performed as described in any of paragraphs (A1) through (A2) wherein (a) the image and the identified image are attached to a compositing engine, (b) the appliance is created on the another of the computing devices and (c) the preparation is reversible after any updates to the disk image running on the another of the computing devices.

(A4) A computing device may be performed as described in any of paragraphs (A1) through (A3), wherein creating the another disk image is done on the another of the computing devices consequent to receiving the binary file of differences by the another of the computing devices.

(A5) A computing device may be performed as described in any of paragraphs (A1) through (A4) the memory further storing instructions that, when executed by the one or more processors, cause the computing device to track versions of the disk images of different computing environments running on computing devices; and wherein creating the another disk image creates a new version of the another disk image operating on the another of the computing devices and the new version of the another disk image operating on the another of the computing devices is added to the tracked version of the another disk image operating on the another of the computing devices.

(A6) A computing device may be performed as described in any of paragraphs (A1) through (A5) wherein versions are tracked using at least one of image cloning, differencing disks, or snapshots.

(A7) A computing device may be performed as described in any of paragraphs (A1) through (A6) wherein the image and the another disk image respectively exist on at least one of a hypervisor or a cloud platform.

(A8) A computing device may be performed as described in any of paragraphs (A1) through (A7) wherein previous versions of images of each of the image and the another disk image are accessible.

The following paragraphs (CRM1) through (CRM4) describe examples of computer-readable media that may be implemented in accordance with the present disclosure.

(CRM1) A non-transitory computer-readable medium storing instructions that, when executed, cause a computing device to: identify an image in response to receipt of a request to prepare updates between disk images of different computing environments running on computing devices, the image being a common disk image between previous versions of the disk images; determine a binary file of differences between a disk image of one of the computing devices and the identified image; attach, using another of the computing devices, the image and the binary file of differences to an appliance executable on that device; and create, using the another of the computing devices, another disk image by applying, using the appliance and the binary file of differences, differences to the identified image.

(CRM2) A non-transitory computer-readable medium may be implemented as described in paragraph (CRM1), further storing instructions that, when executed, cause the computing device to: generalize the another disk image; and apply platform specific files and operations to the generalized another disk image.

(CRM3) A non-transitory computer-readable medium may be implemented as described in any of paragraphs (CRM1) through (CRM2), further storing instructions that, when executed, cause the computing device to track versions of the disk images of different computing environments running on computing devices; and wherein creating the another disk image creates a new version of the another disk image operating on the another of the computing devices and the new version of the another disk image operating on the another of the computing devices is added to the tracked version of the another disk image operating on the another of the computing devices.

(CRM4) A non-transitory computer-readable medium may be implemented as described in any of paragraphs (CRM1) through (CRM3), wherein (a) the preparation is reversible after any updates to the disk image running on the another of the computing devices (b) creating the another disk image is done on the another of the computing devices consequent to receiving the binary file of differences by the another of the computing devices (c) the image and the another disk image respectively exist on at least one of a hypervisor or a cloud platform, and (d) previous versions of images of each of the image and the another disk image are accessible.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
   identifying, in response to receipt of a request to prepare updates between disk images of different computing environments running on computing devices, a common disk image, the common disk image being a disk image common between previous versions of the disk images of the different computing environments running on computing devices;
   determining a binary file of differences between a disk image of a first of the computing devices and the identified common disk image;
   attaching, using a second of the computing devices, the common disk image and the binary file of differences to an appliance executable on the second of the computing devices; and
   creating, using the second of the computing devices, an updated disk image by applying, using the appliance and the binary file of differences, differences to the identified common disk image.

2. The method of claim 1, further comprising:
   generalizing the updated disk image; and
   applying platform specific files and operations to the generalized updated disk image.

3. The method of claim 1, wherein (a) the updated disk image and the identified common disk image are attached to a compositing engine, (b) the appliance is created on the second of the computing devices and (c) the preparation is reversible after any updates to the updated disk image running on the second of the computing devices.

4. The method of claim 1, wherein creating the updated disk image is done on the second of the computing devices consequent to receiving the binary file of differences by the second of the computing devices.

5. The method of claim 1, further comprising:
   tracking versions of the disk images of different computing environments running on computing devices; and wherein
   creating the updated disk image creates a new version of the common disk image operating on the second of the computing devices; and
   the new version of the common disk image operating on the second of the computing devices is added to the tracked version of the updated disk image operating on the second of the computing devices.

6. The method of claim 5, wherein versions are tracked using at least one of image cloning, differencing disks, or snapshots.

7. The method of claim 1, wherein the common disk image and the updated disk image respectively exist on at least one of a hypervisor or a cloud platform.

8. The method of claim 1, wherein previous versions of images of each of the common disk image and the updated disk image are accessible.

9. A computing device comprising:
   one or more processors; and
   memory storing instructions that, when executed by the one or more processors, cause the computing device to:
      identify, in response to receipt of a request to prepare updates between disk images of different computing environments running on computing devices, a common disk image, the common disk image being a disk image common between previous versions of the disk images of different computing environments running on computing devices;
      determine a binary file of differences between a disk image of one of the computing devices and the identified common disk image;
      attach, using a second of the computing devices, the common disk image and the binary file of differences to an appliance executable on the second of the computing devices; and
      create, using the second of the computing devices, an updated disk image by applying, using the appliance and the binary file of differences, differences to the identified common disk image.

10. The computing device of claim 9, the memory further storing instructions that, when executed by the one or more processors, cause the computing device to:
    generalize the updated disk image; and
    apply platform specific files and operations to the generalized updated disk image.

11. The computing device of claim 9, wherein (a) the updated disk image and the identified common image are attached to a compositing engine, (b) the appliance is created on the second of the computing devices and (c) the preparation is reversible after any updates to the updated disk image running on the another of the computing devices.

12. The computing device of claim 9, wherein creating the updated disk image is done on the second of the computing devices consequent to receiving the binary file of differences by the second of the computing devices.

13. The computing device of claim 9, the memory further storing instructions that, when executed by the one or more processors, cause the computing device to track versions of the disk images of different computing environments running on different computing devices; and wherein creating the updated disk image creates a new version of a disk image operating on a third of the computing devices and the new version of the updated disk image operating on the third of the computing devices is added to the tracked version of the updated disk image operating on the second of the computing devices.

14. The computing device of claim 13, wherein versions are tracked using at least one of image cloning, differencing disks, or snapshots.

15. The computing device of claim 9, wherein the common disk image and the updated disk image respectively exist on at least one of a hypervisor or a cloud platform.

16. The computing device of claim 9, wherein previous versions of images of each of the common disk image and the updated disk image are accessible.

17. One or more non-transitory computer-readable media storing instructions that, when executed, cause a computing device to:
    Identify, in response to receipt of a request to prepare updates between disk images of different computing environments running on computing devices, a common disk image, the common disk image being a disk image common between previous versions of the disk images of different computing environments running on computing devices;
determine a binary file of differences between a disk image of a first of the computing devices and the identified common disk image;
attach, using a second of the computing devices, the common disk image and the binary file of differences to an appliance executable on the second of the computing devices; and
create, using the second of the computing devices, an updated disk image by applying, using the appliance and the binary file of differences, differences to the identified common disk image.

18. The one or more non-transitory computer-readable media of claim 17, further storing instructions that, when executed, cause the computing device to:
generalize the updated disk image; and
apply platform specific files and operations to the generalized updated disk image.

19. The one or more non-transitory computer-readable media of claim 15, further storing instructions that, when executed, cause the computing device to track versions of the disk images of different computing environments running on different computing devices; and wherein creating the updated disk image creates a new version of a disk image operating on a third of the computing devices and the new version of the updated disk image operating on the third of the computing devices is added to the tracked version of the updated disk image operating on the second of the computing devices.

20. The one or more non-transitory computer-readable media of claim 15, wherein (a) the preparation is reversible after any updates to the updated disk image running on the second of the computing devices (b) creating the updated disk image is done on the second of the computing devices consequent to receiving the binary file of differences by the second of the computing devices (c) the common disk image and the another disk image respectively exist on at least one of a hypervisor or a cloud platform, and (d) previous versions of images of each of the common disk image and the updated disk image are accessible.

* * * * *